(12) United States Patent
Kim

(10) Patent No.: US 11,578,379 B2
(45) Date of Patent: Feb. 14, 2023

(54) COLD-ROLLED STEEL SHEET HAVING EXCELLENT HIGH-TEMPERATURE PROPERTIES AND ROOM-TEMPERATURE WORKABILITY

(71) Applicant: POSCO, Pohang-si (KR)

(72) Inventor: Jai-Ik Kim, Pohang-si (KR)

(73) Assignee: POSCO, Pohang-si (KR)

( * ) Notice: Subject to any disclaimer, the term of this patent is extended or adjusted under 35 U.S.C. 154(b) by 99 days.

(21) Appl. No.: 16/957,833

(22) PCT Filed: Dec. 18, 2018

(86) PCT No.: PCT/KR2018/016157
§ 371 (c)(1),
(2) Date: Jun. 25, 2020

(87) PCT Pub. No.: WO2019/132384
PCT Pub. Date: Jul. 4, 2019

(65) Prior Publication Data
US 2021/0062283 A1    Mar. 4, 2021

(30) Foreign Application Priority Data

Dec. 26, 2017    (KR) ......................... 10-2017-0180293

(51) Int. Cl.
*B32B 15/01* (2006.01)
*C22C 38/26* (2006.01)
(Continued)

(52) U.S. Cl.
CPC ................ *C21D 9/46* (2013.01); *B32B 15/01* (2013.01); *B32B 15/011* (2013.01); *B32B 15/015* (2013.01); *B32B 15/04* (2013.01); *B32B 15/043* (2013.01); *B32B 15/18* (2013.01); *C21D 6/00* (2013.01); *C21D 6/002* (2013.01); *C21D 6/005* (2013.01); *C21D 6/008* (2013.01); *C21D 8/02* (2013.01); *C21D 8/0205* (2013.01); *C21D 8/0226* (2013.01); *C21D 8/0236* (2013.01); *C21D 8/0247* (2013.01); *C22C 38/00* (2013.01); *C22C 38/001* (2013.01); *C22C 38/002* (2013.01); *C22C 38/004* (2013.01); *C22C 38/04* (2013.01); *C22C 38/06* (2013.01); *C22C 38/12* (2013.01); *C22C 38/18* (2013.01); *C22C 38/22* (2013.01); *C22C 38/26* (2013.01); *C23C 2/04* (2013.01); *C23C 2/26* (2013.01); *C23C 2/28* (2013.01); *C23C 2/40* (2013.01); *C23C 28/02* (2013.01); *C23C 28/021* (2013.01); *C23C 28/023* (2013.01); *C23C 28/025* (2013.01);
(Continued)

(58) Field of Classification Search
CPC ..... B32B 15/011; B32B 15/01; B32B 15/015; B32B 15/04; B32B 15/043; B32B 15/18; B32B 2457/10; C21D 8/02; C21D 8/0205; C21D 8/0226; C21D 8/0236; C21D 8/0247; C21D 6/00; C21D 6/002; C21D 6/005; C21D 6/008; C21D 9/46; C21D 2211/005; C22C 38/00; C22C 38/001; C22C 38/004; C22C 38/04; C22C 38/06; C22C 38/12; C22C 38/18; C22C 38/22; C22C 38/26; C23C 30/00; C23C 30/005; C23C 2/04; C23C 2/26; C23C 2/28; C23C 2/40; C23C 28/021; C23C 28/025; C23C 28/023; C23C 28/322; C23C 28/02; H01M 50/116; H01M 50/119; H01M 50/124; H01M 2220/20; Y02E 60/10; Y10T 428/12944; Y10T 428/12958; Y10T 428/12972; Y10T 428/12937; Y10T 428/24967; Y10T 428/2495; Y10T 428/26

See application file for complete search history.

(56) References Cited

U.S. PATENT DOCUMENTS

2007/0144634 A1    6/2007  Miyazaki et al.
2009/0269661 A1   10/2009  Mori et al.

FOREIGN PATENT DOCUMENTS

CN    1902333 A    1/2007
CN    102286699 A   12/2011
(Continued)

OTHER PUBLICATIONS

Machine Translation, Huang, CN 102286699 A, Dec. 2011. (Year: 2011).*

(Continued)

*Primary Examiner* — Michael E. La Villa
(74) *Attorney, Agent, or Firm* — Morgan, Lewis & Bockius LLP

(57) ABSTRACT

The present disclosure provides a cold-rolled steel sheet having excellent high-temperature properties and room-temperature workability, including, by weight: carbon (C): 0.0005 to 0.003%, manganese (Mn): 0.20 to 0.50%, aluminum (Al): 0.01 to 0.10%, phosphorus (P): 0.003 to 0.020%, nitrogen (N): 0.0005 to 0.004%, sulfur (S): 0.015% or less, niobium (Nb): 0.005 to 0.040%, chromium (Cr): 0.10 to 0.50%, tungsten (W): 0.02 to 0.07%, and a balance of iron (Fe) and other inevitable impurities, wherein C, Nb, and W satisfy the following relationship 1, a microstructure comprises 95 area % or more of polygonal ferrite and 5 area % or less of acicular ferrite, and
the cold-rolled steel sheet comprises (Nb,W)C-based precipitates having an average size of 0.005 to 0.10 μm and a method for manufacturing the same:

$$0.00025 \leq (2 \times Nb/93) \times (W/184)/(C/12) \leq 0.0015 \quad \text{[Relationship 1]}$$

where, C, Nb, and W are in weight %.

6 Claims, 2 Drawing Sheets

(51) Int. Cl.
      *C22C 38/22*    (2006.01)
      *C22C 38/06*    (2006.01)
      *C22C 38/04*    (2006.01)
      *C22C 38/00*    (2006.01)
      *C23C 30/00*    (2006.01)
      *C21D 6/00*     (2006.01)
      *C21D 8/02*     (2006.01)
      *C21D 9/46*     (2006.01)
      *H01M 50/116*   (2021.01)
      *H01M 50/124*   (2021.01)
      *H01M 50/119*   (2021.01)
      *B32B 15/04*    (2006.01)
      *C23C 2/04*     (2006.01)
      *C23C 28/02*    (2006.01)
      *B32B 15/18*    (2006.01)
      *C23C 2/26*     (2006.01)
      *C23C 28/00*    (2006.01)
      *C23C 2/28*     (2006.01)
      *C22C 38/12*    (2006.01)
      *C23C 2/40*     (2006.01)
      *C22C 38/18*    (2006.01)

(52) U.S. Cl.
      CPC ............ *C23C 28/322* (2013.01); *C23C 30/00* (2013.01); *C23C 30/005* (2013.01); *H01M 50/116* (2021.01); *H01M 50/119* (2021.01); *H01M 50/124* (2021.01); *B32B 2457/10* (2013.01); *C21D 2211/005* (2013.01); *H01M 2220/20* (2013.01); *Y02E 60/10* (2013.01); *Y10T 428/12937* (2015.01); *Y10T 428/12944* (2015.01); *Y10T 428/12958* (2015.01); *Y10T 428/12972* (2015.01); *Y10T 428/2495* (2015.01); *Y10T 428/24967* (2015.01); *Y10T 428/26* (2015.01)

(56) References Cited

FOREIGN PATENT DOCUMENTS

| | | |
|---|---|---|
| CN | 105143487 A | 12/2015 |
| CN | 110100022 A | 8/2019 |
| EP | 0620288 A1 | 10/1994 |
| EP | 1 806 420 A1 | 7/2007 |
| EP | 3042976 A1 | 7/2016 |
| IN | 362167 | 3/2015 |
| JP | H07-99686 B2 | 10/1995 |
| JP | H11-189841 A | 7/1999 |
| JP | 2002-212673 A | 7/2002 |
| JP | 2004-143470 A | 5/2004 |
| JP | 2006-328443 A | 12/2006 |
| JP | 2007-254766 A | 10/2007 |
| JP | 2007-291434 A | 11/2007 |
| JP | 2013-512337 A | 4/2013 |
| JP | 2013-222696 A | 10/2013 |
| JP | 2013-224460 A | 10/2013 |
| JP | 2015-206086 A | 11/2015 |
| JP | 6645816 B2 | 2/2020 |
| KR | 10-2003-0053802 A | 7/2003 |
| KR | 100544645 B1 * | 1/2006 |
| KR | 10-2008-0005512 A | 1/2008 |
| KR | 10-2009-0007783 A | 1/2009 |
| KR | 10-2011-0063193 A | 6/2011 |
| KR | 10-2011-0063194 A | 6/2011 |
| KR | 10-2012-0134390 A | 12/2012 |
| KR | 10-1308719 B1 | 9/2013 |
| WO | 00/70110 A1 | 11/2000 |
| WO | 2012/005355 A1 | 1/2012 |
| WO | 2013/002356 A1 | 1/2013 |

OTHER PUBLICATIONS

Machine Translation, Jin, KR 100544645 B1, Jan. 2006. (Year: 2006).*
International Search Report and Written Opinion issued in corresponding International Application No. PCT/KR2018/016157 dated Mar. 26, 2019, with English translation.
Extended European Search Report dated Sep. 7, 2020 issued in European Patent Application No. 18895083.6.
Chinese Office Action dated Apr. 1, 2021 issued in Chinese Patent Application No. 201880084156.9.
Japanese Office Action dated Oct. 5, 2021 issued in Japanese Patent Application No. 2020-535194.

* cited by examiner

[FIG. 1]
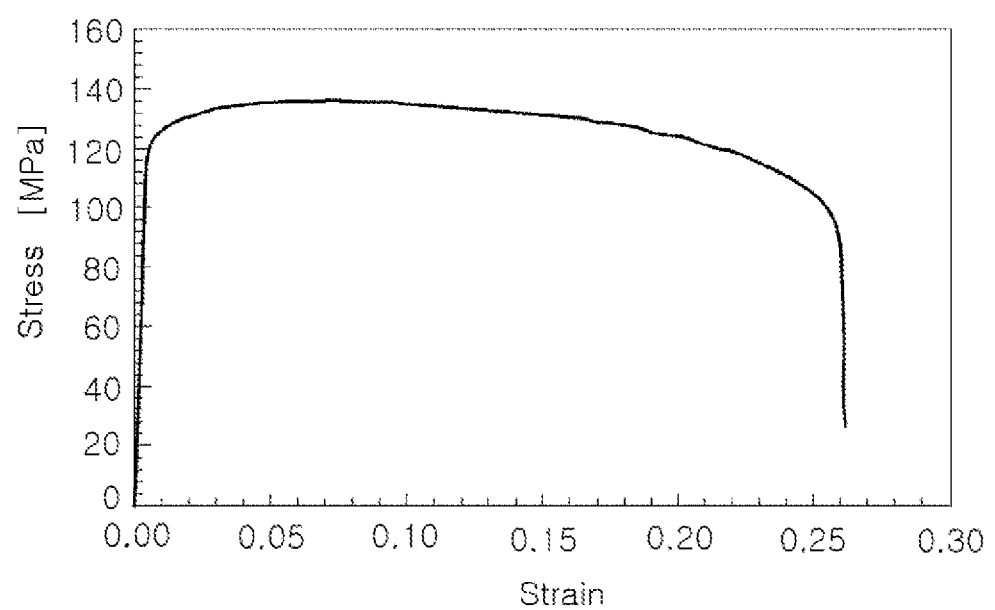

[FIG. 2]
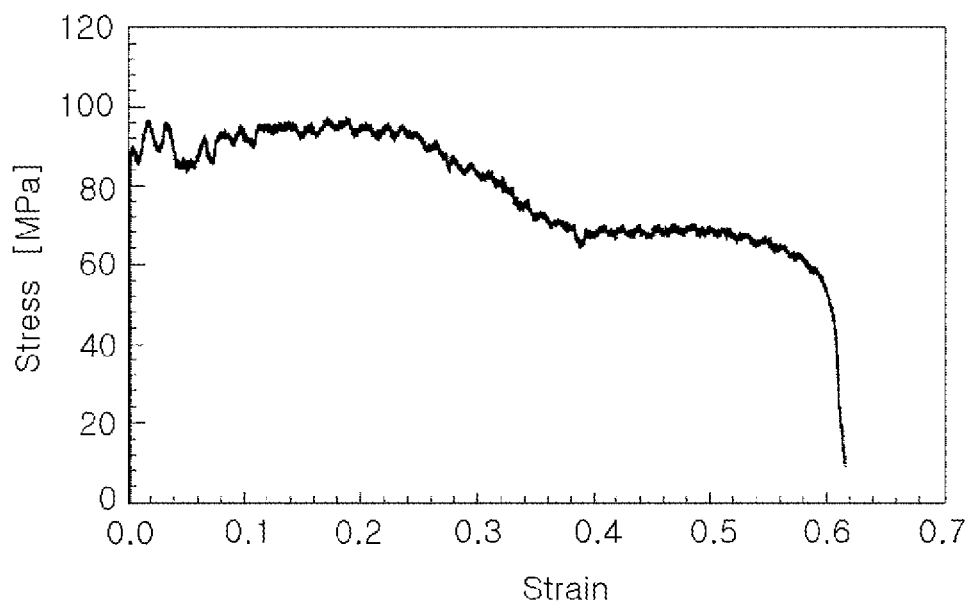

COLD-ROLLED STEEL SHEET HAVING EXCELLENT HIGH-TEMPERATURE PROPERTIES AND ROOM-TEMPERATURE WORKABILITY

CROSS REFERENCE

This application is the U.S. National Phase under 35 U.S.C. § 371 of International Application No. PCT/KR2018/016157 filed on Dec. 18, 2018, which claims the benefit of Korean Application No. 10-2017-0180293 filed on Dec. 26, 2016, the entire contents of each are hereby incorporated by reference.

TECHNICAL FIELD

The present disclosure relates to a cold-rolled steel sheet that may be used in a can for a battery case of a secondary battery, and the like, and a method of manufacturing the same, and more particularly, to a cold-rolled steel sheet having excellent high-temperature properties and room-temperature workability, and a method for manufacturing the same.

BACKGROUND ART

A round steel can used in a battery case for a primary battery may be subjected to a nickel (Ni) or copper (Cu) plating operation, or the like, on a steel sheet, as corrosion resistance is required in order to withstand properties of an alkali material added as the contents of the battery. Recently, a material for a battery case may be widely used not only as a material for the battery case for the primary battery, but also as a material for the battery case for the secondary battery that may be charged/discharged, such as in an electric vehicle field, and the like, including in a mobile field such as mobile phones, a power tool field, and an energy storage device field.

As a usage environment of the material for the battery case, using the steel sheet, is diversified, as described above, demands for improving properties and service life of the battery case are increasing. In addition, in order to increase capacity of a charging body to improve performance of the battery, development of technologies to decrease a thickness of a case body portion and secure safety at the same time may be also actively promoted.

Recently, as an application of the battery case, using steel, has been extended from the mobile field to the vehicle field, there is an increasing demand for improved properties to secure safety of the case, especially for high-temperature properties. As a material for a battery case cell that has used a conventional material such as stainless steel, aluminum, or the like, in the electric vehicle field or the hybrid vehicle field, activities for applying round battery case cells, using steel, in terms of a decrease in costs and an improvement in productivity, have been actively and continuously reviewed. In the case of a vehicle battery, which may be emerging as a new application for the battery case, since the battery may be exposed to a high-temperature environment of several hundred degrees (° C.) instantaneously in an environment of use, it is necessary to secure heat resistance that may be applied to a high-temperature environment even in terms of operating safety.

The heat resistance may be evaluated in a variety of ways. For example, manufacturers that are leading in the electric vehicle field may evaluate battery stability by filling batteries in battery case cells and rapidly heating them to temperatures around 600° C. to investigate breakage properties of the batteries. The evaluation methods, such as applying the above method may be different, depending on manufacturers, but efforts of manufacturers of the material to satisfy the above battery stability have been concentrated.

In addition, driving of an electric vehicle may be affected even in a case in which a battery case is deteriorated and deformed due to an increase in local temperature during the driving of the vehicle. Therefore, in order to prevent this, strain properties at a high-temperature may be also strictly managed. From this perspective, sag resistance may also be considered an important management factor. Sag property refers to a phenomenon in which a component or material exposed to a high-temperature environment may be deteriorated due to repeated heat hysteresis, resulting in sagging of the component or material. When the sagging of the component occurs in the high-temperature environment, it may be difficult to maintain a shape of a molded portion. When thermal stress is concentrated in a specific portion, high-temperature resistance may be lowered to deform a shape of the case. When a degree of sagging is relatively severe, it may lead to a partial breakage of the case, to cause continuous breakages of the case. Therefore, in order to secure stability of the component by securing shape identity of the processed product, in a case of a temperature of managing the component, e.g., in a case of a battery case, high-temperature strength at 600° C. may usually be 110 MPa or more, and sagging of the material should satisfy 3 mm or less. In addition, in order to suppress processing defects, it has been necessary to prevent a dynamic strain aging phenomenon due to solid solution elements in steel and the like, when maintaining high-temperature.

In the past, a stainless steel sheet has been mainly used for heat-resistance applications. However, there was a problem in that such a stainless steel sheet has relatively high production cost due to a relatively large amount of expensive alloying elements such as chromium (Cr) and nickel (Ni), and in that corrosion resistance was lowered due to intergranular corrosion occurring in a Cr depleted zone, as chromium is combined with carbon (C) to precipitate in the form of chromium-carbide at the grain boundary, when maintaining high-temperature.

In the meantime, the battery case used in the electric vehicle may be a structure in which the same cell-processed products are mounted in layered form, in thousands, in a limited space. In addition, since each of the round cases requires multi-step processing operations such as drawing and stretch processing during molding, workability at room-temperature may be also an important management factor, in addition to the high-temperature properties. That is, a steel sheet used as a material for an alkaline manganese battery, a lithium battery case, or the like, may be manufactured as a two-piece round can, in which a lower portion and a body portion of the can, which are cylindrically processed by press molding, may be integrally processed. In this case, a process of simultaneously punching a raw sheet material of 0.4 mm or less with a circular blank and deep drawing the raw sheet material into a cylindrical shape, and an ironing process of passing these drawing materials through a plurality of ironing molds to reduce a thickness of the can and increase a height of the can, may be carried out. As described above, a material for the two-piece battery case may be made thinner than the raw sheet material, as the body portion of the case is subjected to the ironing process in the manufacturing process of the case, and, it is thus known in that a thickness of the body portion of the case is made about 20 to 40% thinner than a thickness of the raw sheet. As a conventional technique for manufacturing such a cylindrical battery case, the technique disclosed in Patent Document 1 and the like may be exemplified.

In addition, Patent Document 2 discloses a technique for improving sealing property of a battery by increasing material strength through a secondary rolling operation, utilizing medium and low carbon steel. However, even in this case, it was not possible to solve the fundamental problems of securing sufficient strength at a high-temperature, e.g., 600° C., and dynamic strain aging required by the battery case for electric vehicles, and the like. As a secondary rolling operation was separately added, there was a problem acting as a factor to increase the manufacturing cost in view of a manufacturing of the raw sheet.

PRIOR TECHNICAL LITERATURE (Patent Document 1) Japanese Patent No. H07-099686
(Patent Document 2) Japanese Patent Laid-Open Publication No. H11-189841

DISCLOSURE

Technical Problem

An aspect of the present disclosure is to provide a cold-rolled steel sheet having excellent high-temperature properties and room-temperature workability, and a method for manufacturing the same.

Another aspect of the present disclosure is to provide a method for manufacturing an ultra-thin cold-rolled steel sheet having excellent high-temperature properties and room-temperature workability at relatively low cost.

Technical Solution

According to an aspect of the present disclosure, a cold-rolled steel sheet having excellent high-temperature properties and room-temperature workability, includes, by weight: carbon (C): 0.0005 to 0.003%, manganese (Mn): 0.20 to 0.50%, aluminum (Al): 0.01 to 0.10%, phosphorus (P): 0.003 to 0.020%, nitrogen (N): 0.0005 to 0.004%, sulfur (S): 0.015% or less, niobium (Nb): 0.005 to 0.040%, chromium (Cr): 0.10 to 0.50%, tungsten (W): 0.02 to 0.07%, and a balance of iron (Fe) and other inevitable impurities, wherein C, Nb, and W satisfy the following relationship 1, a microstructure comprises 95 area % or more of polygonal ferrite and 5 area % or less of acicular ferrite, and the cold-rolled steel sheet comprises (Nb,W)C-based precipitates having an average size of 0.005 to 0.10 μm and a method for manufacturing the same:

$$0.00025 \leq (2 \times Nb/93) \times (W/184)/(C/12) \leq 0.0015 \qquad \text{[Relationship 1]}$$

where, C, Nb, and W are in weight %.

According to an aspect of the present disclosure, a method for manufacturing a cold-rolled steel sheet having excellent high-temperature properties and room-temperature workability, includes: heating a steel slab, the steel slab comprising, by weight, carbon (C): 0.0005 to 0.003%, manganese (Mn): 0.20 to 0.50%, aluminum (Al): 0.01 to 0.10%, phosphorus (P): 0.003 to 0.020%, nitrogen (N): 0.0005 to 0.004%, sulfur (S): 0.015% or less, niobium (Nb): 0.005 to 0.040%, chromium (Cr): 0.10 to 0.50%, tungsten (W): 0.02 to 0.07%, and a balance of iron (Fe) and other inevitable impurities, wherein C, Nb, and W satisfy the following relationship 1; hot-rolling the heated slab at 900 to 950° C. to obtain a hot-rolled steel sheet; coiling the hot-rolled steel sheet at 560 to 680° C.; cold-rolling the coiled hot-rolled steel sheet to obtain a cold-rolled steel sheet; soaking the cold-rolled steel sheet at 730 to 850° C.; and cooling the soaked cold-rolled steel sheet at a cooling rate of 30 to 80° C./s:

$$0.00025 \leq (2 \times Nb/93) \times (W/184)/(C/12) \leq 0.0015 \qquad \text{[Relationship 1]}$$

where, C, Nb, and W are in weight %.

Advantageous Effects

According to an aspect of the present disclosure, it may be possible to manufacture a cold-rolled steel sheet for processing having excellent room-temperature workability, and having excellent high-temperature strength and high-temperature strain properties without occurring dynamic strain aging in a high-temperature environment, to secure shape identity of the product to be used at the high-temperature environment, resulting in high heat resistance properties with high product safety, in various processing processes such as an ironing process and a deep drawing process.

According to another aspect of the present disclosure, a cold-rolled steel sheet having excellent high-temperature properties and room-temperature workability, capable of being manufactured at a lower cost, compared to a stainless steel sheet, may be provided.

DESCRIPTION OF DRAWINGS

FIG. 1 is a graph showing the results of a high-temperature tensile test after maintaining Inventive Example 2 according to an embodiment of the present disclosure at 600° C. for 15 minutes.

FIG. 2 is a graph showing the results of high-temperature tensile test after maintaining Comparative Example 6 according to an embodiment of the present disclosure at 600° C. for 15 minutes.

BEST MODE FOR INVENTION

The present disclosure was completed by present inventors' repeated research and experiments to obtain a steel sheet, which satisfies high-temperature properties such as high-temperature strength of 110 MPa or greater and sagging behavior of 0.05 mm or less at 600° C., and the like, and various room-temperature processing properties such as ironing, bending, and deep-drawing, aging resistance, and corrosion resistance, at the same time.

The main concept of the present disclosure may be as follows.

1) Alloy components and a composition range may be properly controlled to secure excellent room-temperature workability and high-temperature properties.

2) An effective atomic ratio of carbon (C) to niobium (Nb) and tungsten (W) may be properly controlled to form a fine (Nb,W)C-based composite precipitate of 0.005 to 0.10 μm, to control strength and strain behavior at a high-temperature environment, and secure aging resistance and workability at room-temperature.

3) A microstructure of a steel sheet may be controlled to secure excellent high-temperature strength and high-temperature properties as well as excellent room-temperature workability.

4) Heat treatment conditions of a cold-rolled steel sheet may be properly controlled to secure an appropriate microstructure of the steel sheet.

5) As needed, a plating layer and/or an alloyed plating layer may be formed on a surface of a steel sheet to secure excellent corrosion resistance. In particular, excellent corrosion resistance to, for example, alkali components in the battery may be secured.

Hereinafter, the present disclosure will be described in detail.

First, the alloy composition of the present disclosure will be described. The content of the alloy composition described below will be based on weight %.

Carbon (C): 0.0005 to 0.003%

Carbon (C) may be an element added to improve strength of a steel sheet. In the present disclosure, C may mainly be consumed by a reaction of Nb and W for forming a tungsten carbide-based precipitate. As an amount of C increases, there may be a problem that strength increases while workability decreases. Therefore, C may be controlled to define an upper limit to 0.003%. When the C content is less than 0.0005%, sufficient (Nb,W)-based composite carbides may not be smoothly precipitated, and grain growth may not be suppressed in a high-temperature environment. Therefore, target high-temperature strength may not be secured. In addition, since the grain growth may cause processing defects such as orange peel during molding, the C content may be controlled to have a range of 0.0005 to 0.003%. The C content is more preferably provided to have a range of 0.0010 to 0.0028%.

Manganese (Mn): 0.20 to 0.50%

Manganese (Mn) may be a typical element not only for stabilizing austenite, but also for a solid solution strengthening, and may be an element for preventing hot cracking of a slab by increasing strength of steel and depositing S in a form of MnS. In order to obtain the above effects, addition of 0.20% or more is needed. When a relatively large amount of Mn is added, ductility may decrease and central segregation may occur, and Mn may act as a factor for deteriorating corrosion resistance of a steel sheet and plating adhesion during Ni plating. Therefore, Mn may be controlled to define an upper limit to 0.50%. Therefore, the Mn content may be provided to have a range of 0.20 to 0.50%. The Mn content is more preferably provided to have a range of 0.21 to 0.45%.

Aluminum (Al): 0.01 to 0.10%

Aluminum (Al) may be an element added for deoxidation of molten steel, and may be needed to contain 0.01% or more to improve aging properties by combining with solid solution nitrogen in the steel. When Al exceeds 0.10%, an effect of Al may be saturated and an amount of inclusions in the steel may increase, causing surface defects and deteriorating formability. Therefore, the Al content may be provided to have a range of 0.01 to 0.10%. The Al content is more preferably provided to have a range of 0.015 to 0.080%.

Phosphorus (P): 0.003 to 0.020%

Phosphorus (P) may be a relatively inexpensive element improving strength and corrosion resistance of steel, and may be provided to have 0.003% or more to secure such properties. When the P content exceeds 0.020%, it may be segregated into grain boundaries, causing not only embrittlement of grain boundary and deterioration of workability, but also poor adhesion during plating. Therefore, the P content may be controlled to have 0.003 to 0.020%.

Nitrogen (N): 0.0005 to 0.004%

Nitrogen (N) may be an effective element for strengthening a material while being present in a solid state in steel. When N is less than 0.0005%, sufficient stiffness may not be obtained, and a site of formation of precipitates may decrease. When N exceeds 0.004%, it may be a main cause of deterioration of formability by causing hardening of the material due to excess amounts of solid solution elements to occur strain aging. Therefore, the N content may be controlled to have a range of 0.0005 to 0.0040%. The N content is more preferably provided to have a range of 0.0010 to 0.0039%.

Sulfur (S): 0.015% or Less

Sulfur (S) may be combined with Fe in steel to form a non-metallic inclusion, serving as a starting point for corrosion, and may be a factor of red shortness. Therefore, since S is desirable to reduce the content thereof as much as possible, the S content may be limited to have a range of 0.015% or less. In order to effectively secure such an effect, the S content is more preferable controlled to have a range of 0.010% or less.

Niobium (Nb): 0.005 to 0.040%

Niobium (Nb) may be an effective element in terms of securing workability of a steel sheet and miniaturizing high-temperature grains. In the present disclosure, Nb may be preferentially combined with C dissolved in steel, to form NbC and (Nb,W)C-based carbides, to secure aging resistance and formability, and may also provide an effect of suppressing grain growth at a high-temperature environment by these fine precipitates. In order to obtain such an effect, Nb may be provided to have a range of 0.005% or more. When the Nb content exceeds 0.040%, not only workability of hot-rolling may decrease, but also recrystallization temperature may rise rapidly to significantly reduce heat treatment operability of a ultra-thin material. Therefore, the Nb content may be controlled to have a range of 0.005 to 0.040%. The Nb content is more preferably provided to have a range of 0.008 to 0.035%.

Chromium (Cr): 0.10 to 0.50%

Chromium (Cr) may be an element that not only improves corrosion resistance of steel, but also is useful for securing high-temperature properties. In order to improve applicability as a material for battery cases, Cr may be added in an amount of 0.10% or more. When Cr exceeds 0.50%, not only recrystallization may be delayed to deteriorate passing ability of a steel sheet, but also Cr may act as a factor in an increase in manufacturing cost due to an increase in use of expensive chromium. Therefore, the Cr content may be controlled to have a range of 0.10 to 0.50%. The content of Cr is more preferably provided to have a range of 0.13 to 0.45%.

Tungsten (W): 0.02 to 0.07%

Tungsten (W) may be an element added for improving high-temperature properties and corrosion resistance. In order to secure such an effect, 0.02% or more may be required. When the W content exceeds 0.07%, W may be a factor that not only deteriorates rollability, but also may act as a factor of increasing manufacturing costs due to an increase in use of expensive tungsten. The W content may be controlled to have a range of 0.02 to 0.07%. The W content is more preferably provided to have a range of 0.023 to 0.065%.

C, Nb, and W of the alloying components may satisfy the above-described composition range and may satisfy the following relationship 1 at the same time. The following relationship 1 relates to an effective atomic ratio of Nb and W to C. In a case of niobium (Nb) and tungsten (W), it may be important to manage them separately, but the effective atomic ratio of Nb and W to C, that is, $(2 \times Nb/93) \times (W/184)/(C/12)$ may be provided to satisfy a certain range, to control precipitation conditions of (Nb,W)-based composite carbides to simultaneously secure high-temperature properties such as strength, sagging property, and strain behavior at a high-temperature environment as well as room-temperature properties such as aging resistance and workability. When (2×Nb/93)×(W/184)/(C/12) is less than 0.00025, an amount of solid solution elements in steel may increase to deteriorate aging resistance and workability at room-temperature, and as an amount of (Nb,W)C-based composite precipitates is small, high-temperature strength and dynamic strain aging at a high-temperature environment may not be suppressed. When (2×Nb/93)×(W/184)/(C/12) exceeds 0.0015, it may act as a factor of increasing manufacturing costs, and not only increasing a recrystallization temperature of a material rapidly, which may deteriorate passing ability during heat treatment, but also deteriorate surface properties, which may reduce workability of the plating process. Therefore, (2×Nb/93)×(W/184)/(C/12) may satisfy a range of 0.00025 to 0.0015. (2×Nb/93)×(W/184)/(C/12) is more preferably provided to have a range of 0.00026 to 0.00145.

$$0.00025 \leq (2 \times Nb/93) \times (W/184)/(C/12) \leq 0.0015 \quad \text{[Relationship 1]}$$

where C, Nb, and W are in weight %.

The remainder in an embodiment of the present disclosure may be iron (Fe). In an ordinary manufacturing process, impurities which may be not intended may be inevitably incorporated from a raw material or a surrounding environment, and thus, cannot be excluded. These impurities they may be known to any person skilled in the art of manufacturing and thus, may be not specifically mentioned in this specification. In addition, it may be necessary to note that the cold-rolled steel sheet of the present disclosure may additionally include a separate alloy element as required in addition to the above-described alloy composition, and it may not be outside the scope of the present disclosure even when such an alloy element is not described.

A microstructure of a cold-rolled steel sheet according to the present disclosure may include 95 area % or more of polygonal ferrite and 5 area % or less of acicular ferrite. When the fraction of the polygonal ferrite is less than 95 area %, it may be difficult to secure high-temperature properties, especially high-temperature strength. When the fraction of acicular ferrite exceeds 5 area %, workability at room-temperature may be deteriorated by hardening of a material. In this case, there may be a problem in manufacturing a battery case having an appropriate shape.

In addition, a cold-rolled steel sheet of the present disclosure may include (Nb, W)C-based precipitates having an average size of 0.005 to 0.10 μm. When the average size of the precipitates is smaller than 0.005 μm, it is preferable in terms of suppressing grain growth, but a recrystallization temperature may increase to significantly deteriorate annealing passing ability of a ultra-thin material. When the average size of the precipitates exceeds 0.10 μm, there may be a problem that an effect of suppressing abnormal growth of crystal grains during high-temperature work may be reduced, not to secure target high-temperature properties. Therefore, the average size of the precipitates may be provided to have a range of 0.005 to 0.10 μm. The average size of the precipitate is more preferably provided to have a range of 0.008 to 0.09 μm.

A cold-rolled steel sheet of the present disclosure may include an alloyed plating layer on at least one surface thereof. In this case, the plating layer may include a single plating layer or multiple plating layers, a single alloyed plating layer or multiple alloyed plating layers, or multiple layers of a plating layer and an alloyed plating layer. The plating layer or the alloyed plating layer is not particularly limited in its kind, as long as it may ensure corrosion resistance. A single plating layer or multiple plating layers, and/or an alloyed plating layer obtained by thermal diffusion of these plating layers may be provided to be formed on at least one surface of the steel sheet, preferably on both surfaces of the steel sheet.

In the present disclosure, the alloyed plating layer may be a Fe—Ni alloyed plating layer, wherein the Fe—Ni alloyed plating layer may have an alloying rate of 5 to 25 area %. For example, when the cold-rolled steel sheet of the present disclosure is applied as a steel sheet for a battery case, an Fe—Ni alloyed plating layer may be included on both surfaces of the steel sheet. The formation of the Fe—Ni alloyed plating layer may secure excellent corrosion resistance to the alkali content of the battery. Since a fraction of an alloying layer in the Fe—Ni alloyed plating layer has a close relationship with corrosion resistance and surface hardness of the material, it may be necessary to secure an appropriate fraction of the alloying layer. When an alloying rate of the Fe—Ni alloyed plating layer is less than 5 area %, a surface material of the plating material may be cured due to a relatively low alloying rate, resulting in a problem of deteriorating a life span of a processed mold. When the alloying rate exceeds 25 area %, it may be advantageous in term of a life span of a mold is improved, but a phenomenon in which corrosion resistance of the surface layer is deteriorated may occur. Therefore, the alloying rate of the Fe—Ni alloyed plating layer may be provided to have a range of 5 to 25 area %. The alloying rate of the Fe—Ni alloyed plating layer is more preferably provided to have a range of 6 to 23 area %. In this case, the alloying rate refers to a fraction of a compounded layer of Fe and Ni, composed of FeNi2 generated at an interface between Fe and Ni among all Ni plating layers, and is characterized in that the Fe—Ni alloyed plating layer is harder than a Fe layer, but softer than a pure Ni layer.

The cold-rolled steel sheet of the present disclosure, provided as described above, may have a thickness of 0.1 to 0.5 mm, more preferably a thickness of 0.16 to 0.4 mm.

In addition, the cold-rolled steel sheet of the present disclosure may satisfy high-temperature properties such as high-temperature strength of 110 MPa or greater and sagging behavior of 0.05 mm or less at 600° C., and the like, and various room-temperature processing properties such as ironing, bending, and deep-drawing, aging resistance, and corrosion resistance, at the same time.

Hereinafter, a method for manufacturing the cold-rolled steel sheet of the present disclosure will be described.

First, a steel slab having the above-described alloy composition may be heated. A heating temperature of the steel slab is not particularly limited, but may be performed at 1180 to 1280° C. When the heating temperature of the steel slab is less than 1180° C., there may be a problem of causing material non-uniformity due to a decrease in temperature during hot-rolling. When the heating temperature of the steel slab exceeds 1280° C., there may be disadvantageous in that amounts of a surface scale layer may increase to cause surface defects in subsequent operation(s).

Subsequently, the heated slab may be hot-finish-rolled at 900 to 950° C. to obtain a hot-rolled steel sheet. When a temperature of the finish-rolling is less than 900° C., hot-rolling may be completed in a relatively low temperature region, resulting in mixing of final formed crystal grains, and resulting in deterioration of workability and rollability. When a temperature of the finish-rolling exceeds 950° C., uniform rolling over the entire thickness may not be achieved such that grain refinement becomes insufficient to decrease impact toughness due to grain coarsening and surface scale increases to cause surface defects. Therefore, a temperature of the finish-rolling may be provided to have a range of 900 to 950° C.

Thereafter, the hot-rolled steel sheet may be coiled at 560 to 680° C. The coiling may be performed after being cooled to a desired condition in a run-out table (ROT). When a coiling temperature is less than 560° C., a material of the hot-rolled material may be hardened to increase rolling load in the cold-rolling, which may be the next operation, to cause a decrease in rolling operability, and temperature unevenness in a width direction may deepen, resulting in a problem that acts as a factor of variation in material and deterioration in workability, as precipitation pattern of low temperature precipitates changes. When a coiling temperature is higher than 680° C., grains of the product may grow, which not only lowers high-temperature properties during high-temperature treatment, but also acts as a factor to lower corrosion resistance of the material. The coiling temperature is more preferably provided to have a range of 570 to 670° C.

The coiled hot-rolled steel sheet may be cold-rolled to obtain a cold-rolled steel sheet. A reduction ratio during the cold-rolling may be provided to have a range of 80 to 95%. In the cold-rolling, although the reduction ratio may be 80% or more to secure strength and thickness of the material, when the reduction ratio exceeds 95%, it may act as a factor of problems in equipment due to rolling of a rolling mill. Therefore, the reduction ratio during the cold-rolling may be provided to have a range of 80 to 95%, and is more preferably provided to have a range of 85 to 90%.

The cold-rolled steel sheet may be soaked at 730 to 850° C. When a temperature of the soaking is less than 730° C., a fraction of recrystallized grains may be decreased. Therefore, since strength may be relatively high, while ductility may be relatively deteriorated, workability for making a battery case may not be obtained. When a temperature of the soaking exceeds 850° C., it may be advantageous in terms of completion of recrystallization and securing of driving force for structure transformation of acicular ferrite, but it may cause defects such as heat-buckle by heat treatment, to act as a factor of deterioration in annealing passing ability of a steel sheet. Therefore, a temperature of the soaking may be provided to have a range of 730 to 850° C. A temperature of the soaking is more preferably provided to have a range of 735 to 840° C.

The soaked cold-rolled steel sheet may be cooled at a cooling rate of 30 to 80° C./s. When the cooling rate is less than 30° C./s, a fraction of acicular ferrite grains obtained after heat treatment may be relatively low. In this case, it may be difficult to suppress grain growth at a high-temperature environment, making it difficult to secure targeted high-temperature properties. When the cooling rate exceeds 80° C./s, it may act as a factor of defects in shape and variation in material due to deterioration in workability at room-temperature, and unevenness in cooling in the width direction according to an increase in strength. Therefore, the cooling rate may be provided to have a range of 30 to 80° C./s. The cooling rate is more preferably provided to have a range of 35 to 75° C./s.

When the cooling, a cooling end temperature may be preferably 450 to 350° C. When the cooling end temperature is less than 350° C., it may be difficult to control a shape of the material, and may also act as a factor in increasing load of a cooling facility, which may deteriorate workability of the material. When the cooling end temperature exceeds 450° C., an amount of solid solution elements in steel may be increased. Therefore, the cooling end temperature may be provided to have a range of 450 to 350° C.

After the cooling is finished, forming a plating layer on a surface of the cold-rolled steel sheet may be further included. In addition, the present disclosure may further include performing an alloying heat treatment on the plated cold-rolled steel sheet to obtain a cold-rolled steel sheet having an alloyed plating layer formed thereon. As a plating method for forming the plating layer, for example, a hot-dip plating method or an electroplating method may be applied. Thereamong, the electroplating method is preferably applied.

The alloying heat treatment may be performed at 650 to 750° C. When a temperature of the alloying heat treatment is less than 650° C., there may be a problem in that workability of the battery case or the like may be deteriorated, as a desired alloying fraction is not secured. When a temperature of the alloying heat treatment exceeds 750° C., although it may be advantageous in terms of securing the alloying fraction of the plating layer, surface grains of a plated material may grow abnormally and may act as a factor for deteriorating workability and corrosion resistance. Therefore, a temperature of the alloying heat treatment may be provided to have a range of 650 to 750° C. The alloying heat treatment may be performed for a relatively short time within 3 seconds. The alloying heat treatment temperature is more preferably provided to have a range of 660 to 740° C.

The plating layer may be a Ni plating layer, the alloyed plating layer may be an Fe—Ni alloyed plating layer. The Fe—Ni alloyed plating layer may be obtained by a method such as heat treatment of the Ni plating layer. In this case, a thickness of the Ni plating layer may be provided to have a range of 1 to 5 μm. When the thickness of the Ni plating layer is less than 1 μm, there may be a disadvantage that it may be difficult to secure corrosion resistance. When the thickness of the Ni plating layer exceeds 5 μm, it may be advantageous to secure corrosion resistance, but may be a factor of increasing costs due to an increase in usage of expensive Ni. In addition, as a relatively hard Ni layer is formed thick, there may be a disadvantage that it acts as a factor of defects during processing. A thickness of the Ni plating layer is more preferably provided to have a range of 1 to 4 μm.

MODE FOR INVENTION

Hereinafter, the present disclosure will be described in more detail by the following examples. However, it may be necessary to note that the following examples may be only intended to illustrate the present disclosure in more detail and may not be intended to limit the scope of the present disclosure. This is because the scope of the present disclosure may be determined by matters described in the claims and reasonably inferred therefrom.

Example

After heating a steel slab having the alloy composition of Table 1 to 1230° C., the steel slab was hot-rolled, coiled, soaked, and cooled under the conditions of Table 2, to prepare a cold-rolled steel sheet having a thickness of 0.30 mm. Properties of the cold-rolled steel sheet thus prepared were evaluated at room-temperature and high-temperature, and the results therefrom were shown in Table 3 below. In addition, after Ni plating the cold-rolled steel sheet, an alloying treatment was also performed by applying the temperature of the alloying treatment, shown in Table 2 below, to form a Fe—Ni alloyed plating layer on a surface of the cold-rolled steel plate.

Among the properties listed in Table 3, a high-temperature aging property was maintained at 600° C. for 15 minutes, and then, when the high-temperature tensile test was performed, a case in which dynamic strain aging occurred was represented as "occurred," and a case in which dynamic strain aging did not occur was represented as "non-occurred." The present disclosure is to achieve "non-occurred."

In addition, in a sagging resistance test, a material having a length of 250 mm and a width of 30 mm was heated at 600° C. for 100 hours using a heat treatment facility, and then sagging of the steel sheet was measured. If a degree of sagging is less than 3 mm, it was judged as good ("○"). If a degree of sagging is equal to or more than 3 mm, it was judged as poor ("x").

In addition, if high-temperature strength obtained by a high-temperature tensile test at 600° C. was less than 110 MPa, it was judged as poor ("x"), and if high-temperature strength is equal to or more than 110 MPa, it was judged as good ("○").

In a workability test, in which a drawing process at room-temperature is performed in conditions that a drawing ratio expressed as a ratio of a drawing die diameter to a blank diameter of a material is 1.85, when ear occurrence was 2.5% or more or soaking occurred, it was represented as poor ("x"), and when ear occurrence was less than 2.5% and soaking did not occur, it was represented as good ("○"). In this case, the ear occurrence was obtained by the relationship {(average peak height)−(average peak height)}/[0.5×{(average peak height)+(average peak height)}×100, from a drawing processed cup.

A corrosion resistance evaluation of the plated processed product was carried out by a salt spray test (SST). Through this, when red rust occurred within 12 hours, it was represented as poor ("x"), and when red rust occurred exceeding 12 hours, it was represented as good ("○").

TABLE 1

| | Alloy Composition (Wt %) | | | | | | | | | |
|---|---|---|---|---|---|---|---|---|---|---|
| | C | Mn | Al | P | N | S | Nb | Cr | W | Relationship |
| IS1 | 0.0018 | 0.28 | 0.029 | 0.008 | 0.0028 | 0.005 | 0.026 | 0.18 | 0.034 | 0.00069 |
| IS2 | 0.0024 | 0.41 | 0.043 | 0.007 | 0.0035 | 0.008 | 0.019 | 0.34 | 0.041 | 0.00046 |
| IS3 | 0.0014 | 0.36 | 0.051 | 0.011 | 0.0018 | 0.009 | 0.031 | 0.27 | 0.044 | 0.00137 |
| IS4 | 0.0021 | 0.23 | 0.044 | 0.009 | 0.0014 | 0.011 | 0.016 | 0.42 | 0.028 | 0.00030 |
| CS1 | 0.0028 | 0.37 | 0.025 | 0.006 | 0.0071 | 0.006 | 0.003 | 0.12 | 0.011 | 0.00002 |
| CS2 | 0.0057 | 0.42 | 0.019 | 0.012 | 0.0019 | 0.005 | 0.142 | 0.03 | 0.047 | 0.00164 |
| CS3 | 0.0022 | 0.89 | 0.132 | 0.009 | 0.0024 | 0.013 | — | 0.34 | 0.248 | 0 |
| CS4 | 0.0019 | 0.32 | 0.002 | 0.047 | 0.0034 | 0.029 | 0.024 | 0.92 | — | 0 |
| CS5 | 0.0164 | 0.11 | 0.047 | 0.008 | 0.0031 | 0.007 | 0.032 | — | 0.006 | 0.00002 |

[Relationship] (2 × Nb/93) × (W/184)/(C/12) (where the contents of C, Nb, and W are based on wt %).
IS: Inventive Steel,
CS: Comparative Steel

TABLE 2

| | Steel No. | Hot Finish Rolling Temp. (° C.) | Coiling Temp. (° C.) | Soaking Temp. (° C.) | Cooling Rate (° C./s) | Cooling End Temp. (° C.) | Alloying Heat Treatment Temp. (° C.) |
|---|---|---|---|---|---|---|---|
| CE1 | IS1 | 790 | 580 | 740 | 65 | 425 | 780 |
| IE1 | | 920 | 580 | 760 | 47 | 430 | 700 |
| IE2 | | 920 | 580 | 780 | 73 | 410 | 740 |
| IE3 | IS2 | 910 | 620 | 760 | 57 | 385 | 670 |
| IE4 | | 910 | 620 | 760 | 46 | 440 | 720 |
| CE2 | | 910 | 500 | 760 | 52 | 480 | 720 |
| IE5 | IS3 | 930 | 660 | 750 | 64 | 410 | 690 |
| IE6 | | 930 | 660 | 800 | 62 | 370 | 740 |
| CE3 | | 930 | 660 | 700 | 21 | 410 | 730 |
| IE7 | IS4 | 920 | 640 | 780 | 55 | 415 | 730 |
| CE4 | | 920 | 640 | 880 | 104 | 240 | 720 |
| CE5 | | 920 | 720 | 800 | 67 | 410 | 600 |
| CE6 | CS1 | 910 | 620 | 780 | 43 | 420 | 730 |
| CE7 | CS2 | 910 | 620 | 780 | 48 | 425 | 730 |
| CE8 | CS3 | 910 | 620 | 780 | 45 | 425 | 740 |
| CE9 | CS4 | 910 | 620 | 780 | 51 | 420 | 740 |
| CE10 | CS5 | 910 | 620 | 780 | 54 | 390 | 740 |

IE: Inventive Example,
CE: Comparative Example,
IS: Inventive Steel,
CS: Comparative Steel

TABLE 3

| | P.F Fraction (Area %) | Precipitate Average Size (μm) | Alloying Rate (%) | Room-Temp. Properties | | | Properties at 600° C. | | | |
|---|---|---|---|---|---|---|---|---|---|---|
| | | | | Workability | Ear Occurrence (%) | Soaking | Corrosion Resistance | Aging Property | Sagging Resistance | High Temp. Strenth |
| CE1 | 84 | 0.003 | 26.4 | x | — | Breakage | o | x | x | x |
| IE1 | 97 | 0.028 | 11.3 | o | 1.46 | Good | o | o | o | o |
| IE2 | 99 | 0.032 | 17.2 | o | 1.52 | Good | o | o | o | o |
| IE3 | 96 | 0.052 | 13.8 | o | 1.79 | Good | o | o | o | o |
| IE4 | 97 | 0.048 | 15.7 | o | 2.04 | Good | o | o | o | o |
| CE2 | 91 | 0.008 | 13.8 | x | 4.12 | Good | o | o | o | o |
| IE5 | 98 | 0.047 | 7.4 | o | 1.57 | Good | o | o | o | o |
| IE6 | 98 | 0.035 | 19.3 | o | 1.96 | Good | o | o | o | o |
| CE3 | 100 | 0.004 | 10.2 | x | 3.65 | Good | o | x | x | x |
| IE7 | 97 | 0.065 | 14.3 | o | 2.19 | Good | o | o | o | o |
| CE4 | 82 | 0.003 | 14.9 | x | — | Breakage | o | x | x | x |
| CE5 | 94 | 0.014 | 3.9 | x | 3.42 | Good | x | x | o | o |
| CE6 | 93 | 0.001 | 4.5 | o | 2.35 | Good | x | x | x | x |
| CE7 | 92 | 0.074 | 24.5 | x | — | Breakage | o | x | o | o |
| CE8 | 94 | — | 3.8 | x | — | Breakage | x | x | x | x |
| CE9 | 92 | — | 4.2 | x | 3.67 | Good | x | x | x | x |
| CE10 | 98 | 0.002 | 10.5 | x | — | Breakage | o | x | x | x |

P.F refers to polygonal ferrite, and a microstructure, except for P.F, refers to acicular ferrite.
IE: Inventive Example,
CE: Comparative Example As can be seen from Tables 1 to 3, in cases of Inventive Examples 1 to 6 satisfying the alloy composition and manufacturing conditions proposed by the present disclosure, a microstructure, an average size of precipitates, an alloying rate, and the like were satisfied. When properties at a high-temperature environment are evaluated, dynamic strain aging behavior did not occur, high-temperature strength satisfied 110 MPa or more, and a degree of sagging was less than 3 mm to obtain excellent sagging resistance. In addition, even in a room-temperature processing test, since ear occurrence due to drawing was less than 2.5%, and a soaking phenomenon did not occur, at the same time, workability at room-temperature was good. Also, even in a salt spray experiment after 12 hours, red rust did not occur, to obtain good results in terms of corrosion resistance.

In cases of Comparative Examples 1 to 5 in which, although may be inventive steel, the alloy composition of the present disclosure is satisfied, and a portion of the manufacturing conditions is outside of the scope of the present disclosure, a microstructure fraction, a average size of precipitates, or a alloying rate did not satisfy those proposed by the present disclosure, and problems such as recrystallization not completed in the heat treatment process, or the like, were generated. Therefore, it can be seen that it does not have excellent high-temperature properties or poor processing properties at room-temperature and poor aging resistance.

In addition, in cases of Comparative Examples 6 to 10 in which the alloy composition proposed by the present disclosure is satisfied, and a portion of the manufacturing conditions is outside of the scope of the present disclosure, a microstructure fraction, an average size of precipitates, or an alloying rate did not satisfy those proposed by the present disclosure. Therefore, it can be seen that properties at room-temperature and high-temperature did not satisfy those proposed by the present disclosure.

Thereamong, in the case of Comparative Example 6, ear occurrence was 2.35%, no breakage occurred during drawing processing, and workability was good, but an alloying rate was low. Therefore, corrosion resistance could not be secured, it was considered to be because an effect of forming (Nb,W)C-based composite precipitates was decreased as an amount of components added such as Nb and W was lower than the range proposed by the present disclosure. In addition, in the case of Comparative Examples 8 to 10, it was difficult to satisfy workability at room-temperature and high-temperature property at the same time, as not only the workability at room-temperature was poor, but also the high-temperature properties could not be achieved.

FIG. 1 is a graph showing the results of a high-temperature tensile test after maintaining Inventive Example 2 at 600° C. for 15 minutes. As can be seen from FIG. 1, in the case of Inventive Example 2, it shows a uniform change in stress, as strain increases during the high-temperature tensile test. For example, it can be seen that dynamic strain aging did not occur.

FIG. 2 is a graph showing the results of high-temperature tensile test after maintaining Comparative Example 6 at 600° C. for 15 minutes. As can be seen from FIG. 2, in the case of Comparative Example 2, it shows a stress fluctuation behavior of a saw blade shape in which stress increases and decreases repeatedly, as strain increases in a stress-strain curve. This strain behavior may be due to dynamic strain aging phenomenon of steel, and such a behavior may cause structure to break due to an increase in local strain during a rapid thermal shock.

While example embodiments have been shown and described above, it will be apparent to those skilled in the art that modifications and variations could be made without departing from the scope of the present invention as defined by the appended claims.

The invention claimed is:

1. A cold-rolled steel sheet having excellent high-temperature properties and room-temperature workability, comprising, by weight: carbon (C): 0.0005 to 0.003%, manganese (Mn): 0.20 to 0.50%, aluminum (Al): 0.01 to 0.10%, phosphorus (P): 0.003 to 0.020%, nitrogen (N): 0.0005 to 0.004%, sulfur (S): 0.015% or less, niobium (Nb): 0.005 to 0.040%, chromium (Cr): 0.10 to 0.50%, tungsten (W): 0.02 to 0.07%, and a balance of iron (Fe) and other inevitable impurities, wherein C, Nb, and W satisfy the following relationship 1, a microstructure comprises 95 area % or more of polygonal ferrite and 5 area % or less of acicular ferrite, and the cold-rolled steel sheet comprises (Nb,W)C-based composite precipitates having an average size of 0.005 to 0.10 μm:

$$0.00025 \leq (2 \times Nb/93) \times (W/184)/(C/12) \leq 0.0015 \quad \text{[Relationship 1]}$$

where, C, Nb, and W are in weight %.

2. The cold-rolled steel sheet according to claim 1, wherein the cold-rolled steel sheet comprises an alloyed plating layer on at least one surface thereof.

3. The cold-rolled steel sheet according to claim 2, wherein the alloyed plating layer is a Fe—Ni alloyed plating layer.

4. The cold-rolled steel sheet according to claim 3, wherein the Fe—Ni alloyed plating layer has an alloying rate of 5 to 25 area %,
   where the alloying rate refers to a fraction of a compounded layer of Fe and Ni, composed of $FeNi_2$ generated at an interface between Fe and Ni among all Ni plating layers.

5. The cold-rolled steel sheet according to claim 1, wherein the cold-rolled steel sheet has a thickness of 0.1 to 0.5 mm.

6. The cold-rolled steel sheet according to claim 1, wherein the cold-rolled steel sheet is in a form of a battery case of a secondary battery.

* * * * *